United States Patent
Castellano et al.

(10) Patent No.: US 7,569,511 B2
(45) Date of Patent: Aug. 4, 2009

(54) CATALYST COMPOSITION FOR ALCOHOL STEAM REFORMING

(75) Inventors: Christopher R. Castellano, Ringoes, NJ (US); Ye Liu, Holmdel, NJ (US); Ahmad Moini, Princeton, NJ (US); Gerald Stephen Koermer, Basking Ridge, NJ (US); Robert Joseph Farrauto, Princeton, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 494 days.

(21) Appl. No.: 11/381,802

(22) Filed: May 5, 2006

(65) Prior Publication Data

US 2007/0258882 A1 Nov. 8, 2007

(51) Int. Cl.
- B01J 23/00 (2006.01)
- B01J 21/00 (2006.01)
- B01J 20/00 (2006.01)
- B01J 29/00 (2006.01)
- B01J 37/00 (2006.01)
- C22C 28/00 (2006.01)
- C22C 5/04 (2006.01)
- C22C 9/04 (2006.01)
- C22C 18/00 (2006.01)

(52) U.S. Cl. .................. 502/304; 502/60; 502/64; 502/65; 502/66; 502/73; 502/74; 502/87; 502/302; 502/303; 502/262; 502/263; 502/326; 502/327; 502/328; 502/329; 502/332; 502/333; 502/339; 502/349; 502/350; 502/351; 502/355; 502/415; 502/439; 420/416; 420/463; 420/483; 420/513

(58) Field of Classification Search ............. 502/60, 502/64, 65, 66, 73, 74, 85, 302, 303, 304, 502/262, 263, 324, 326, 327, 328, 329, 332, 502/333, 336, 338, 339, 349, 350, 351, 355, 502/415, 439, 87; 420/416, 463, 483, 513

See application file for complete search history.

(56) References Cited

U.S. PATENT DOCUMENTS

| | | | |
|---|---|---|---|
| 5,208,203 A * | 5/1993 | Horiuchi et al. | 502/302 |
| 5,851,949 A * | 12/1998 | Galperin et al. | 502/333 |
| 6,576,217 B1 | 6/2003 | Nojima et al. | |
| 6,783,741 B2 | 8/2004 | Edlund et al. | |
| 6,802,876 B1 | 10/2004 | Kobayashi et al. | |
| 6,818,589 B1 * | 11/2004 | Gillespie | 502/326 |
| 6,849,572 B2 | 2/2005 | Hwang et al. | |
| 6,849,573 B2 | 2/2005 | Haga et al. | |
| 6,926,881 B2 | 8/2005 | Hirose et al. | |

(Continued)

OTHER PUBLICATIONS

Iwasa et al, Effect of Zn addition to supported Pd catalysts in the steam reforming of methanol, Division of Materials Science and Engineering, Applied Catalysts A: General 248 2003, 153-160, Japan.

(Continued)

*Primary Examiner*—Cam N Nguyen
(74) *Attorney, Agent, or Firm*—Bernard Lau

(57) ABSTRACT

An alcohol steam reforming catalyst for generating hydrogen contains palladium, yttrium, and at least one of cerium and a metal oxide. The catalyst displays both an improved alcohol conversion rate and improved carbon dioxide selectivity. Methods of making and using the alcohol steam reforming catalyst are described.

24 Claims, 3 Drawing Sheets

U.S. PATENT DOCUMENTS

| | | | |
|---|---|---|---|
| 6,936,237 | B2 | 8/2005 | Wang et al. |
| 6,958,407 | B2 * | 10/2005 | Mori et al. .................. 554/135 |
| 7,109,145 | B2 * | 9/2006 | Ruth et al. ................... 502/326 |
| 7,138,353 | B2 * | 11/2006 | Takeshima et al. ............ 502/64 |
| 7,208,136 | B2 * | 4/2007 | Holladay et al. ............. 423/652 |
| 7,307,040 | B2 * | 12/2007 | Schlitter et al. .............. 502/331 |
| 7,348,288 | B1 * | 3/2008 | Kittrell ........................ 502/102 |
| 7,351,328 | B2 * | 4/2008 | Choudhary et al. .......... 208/247 |
| 7,452,844 | B2 * | 11/2008 | Hu et al. ...................... 502/327 |
| 2001/0016188 | A1 | 8/2001 | Haga et al. |
| 2001/0026782 | A1 | 10/2001 | Wang et al. |
| 2003/0186804 | A1 * | 10/2003 | Wagner et al. ............... 502/300 |
| 2003/0194359 | A1 | 10/2003 | Gervasio et al. |
| 2003/0194362 | A1 | 10/2003 | Rogers et al. |
| 2003/0194363 | A1 | 10/2003 | Koripella et al. |
| 2005/0181940 | A1 * | 8/2005 | Wang et al. .................. 502/330 |
| 2006/0173224 | A1 * | 8/2006 | Putman et al. ............... 585/258 |
| 2006/0178262 | A1 * | 8/2006 | Rokicki et al. .............. 502/330 |

OTHER PUBLICATIONS

Iwasa et al, New catalytic functions of Pd-Zn, Pd-Ga, Pd-In, Pt-Zn, Pt-Ga and Pt-In alloys in the conversions of methanol, Division of Materials Science and Engineering, Catalysts Letters 54 1998, 119-123, Japan.

Takezawa et al, Steam reforming and dehydrogenation of methanol: Difference in the catalytic functions of copper and group VIII metals, Division of Materials Science and Engineering, Catalysts Today 36, 1997, 45-56, Japan.

Setthapun et al, High-Throughput Screening of Carbide and Nitride Based Methanol Steam Reforming Catalysts, Michigan, USA.

Suwa et al, Comparative study between Zn-Pd/C and Pd/ZnO catalysts for steam reforming of methanol, Institute of Materials Science, Applied Catalysts A: General 267, 2004, 9-16, Japan.

Segal et al, Low Temperature Steam Reforming of Methanol Over Layered Double Hydroxides, Fuel Chemistry Division Preprints, 2001, 46.

* cited by examiner

Example 2            24.23688
Comparative Example 2    19.63299

Example 2 95.47079
Comparative Example 2 93.61809

CATALYST COMPOSITION FOR ALCOHOL STEAM REFORMING

STATEMENT REGARDING FEDERALLY SPONSORED RESEARCH

The invention was made with United States Government support under Cooperative Agreement Number 70NANB3H3012 awarded by the National Institute of Standards and Technology (NIST). The United States Government has certain rights in the invention.

TECHNICAL FIELD

The subject invention generally relates to catalysts for converting an alcohol and water to hydrogen and carbon dioxide and associated methods involving the catalysts.

BACKGROUND

Generally speaking, methanol steam reforming is the chemical process of converting methanol to hydrogen and carbon oxides. The methanol steam reforming chemical process can be facilitated by using a catalyst. The hydrogen generated by the chemical process can be used in many applications. One such application of hydrogen generated by steam reforming is use in fuel cells.

Fuel cells are power generation devices that create electricity by stripping electrons from hydrogen. The hydrogen may be derived from hydrogen-rich fuels such as hydrocarbons and alcohols. Various different types of fuel cells exist. Examples include proton exchange membrane fuel cells, phosphoric acid fuel cells, molten carbonate fuel cells, solid oxide fuel cells, direct methanol fuel cells, and alkaline fuel cells. A common operational feature to fuel cells is that they function by removing electrons from hydrogen atoms for the purpose of generating electricity. The remaining hydrogen protons combine with electrons and oxygen to produce water.

In order to operate most fuel cells, catalysts are employed to facilitate the generation of hydrogen. Generally speaking, catalysts often have certain desirable characteristics. Unfortunately, a catalyst may have one desirable characteristic but another undesirable characteristic. Given the unpredictable nature of catalysts in general, it is difficult to obtain fuel cell catalysts with many desirable characteristics and few or no undesirable characteristics.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention provides alcohol steam reforming catalysts that have both good alcohol/methanol activity and good carbon dioxide selectivity. One aspect of the invention relates to alcohol steam reforming catalysts that contain a suitable amount of yttrium in addition to palladium, a metal oxide and/or cerium, and optionally zinc.

Another aspect of the invention relates to methods of making alcohol steam reforming catalysts involving contacting a metal oxide and/or cerium, palladium, yttrium, and optionally zinc to provide the alcohol steam reforming catalyst. The catalyst may be further coated on a green unfired ceramic structure and fired.

Yet another aspect of the invention relates to methods of making hydrogen involving contacting a lower alcohol with water in the presence of an alcohol steam reforming catalyst, the alcohol steam reforming catalyst containing a metal oxide and/or cerium, palladium, yttrium, and optionally zinc.

Still yet another aspect of the invention relates to methods of increasing both alcohol/methanol activity and carbon dioxide selectivity in making hydrogen involving contacting a lower alcohol with water in the presence of an alcohol steam reforming catalyst, the steam reforming catalyst containing a metal oxide and/or cerium, palladium, yttrium, and optionally zinc.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
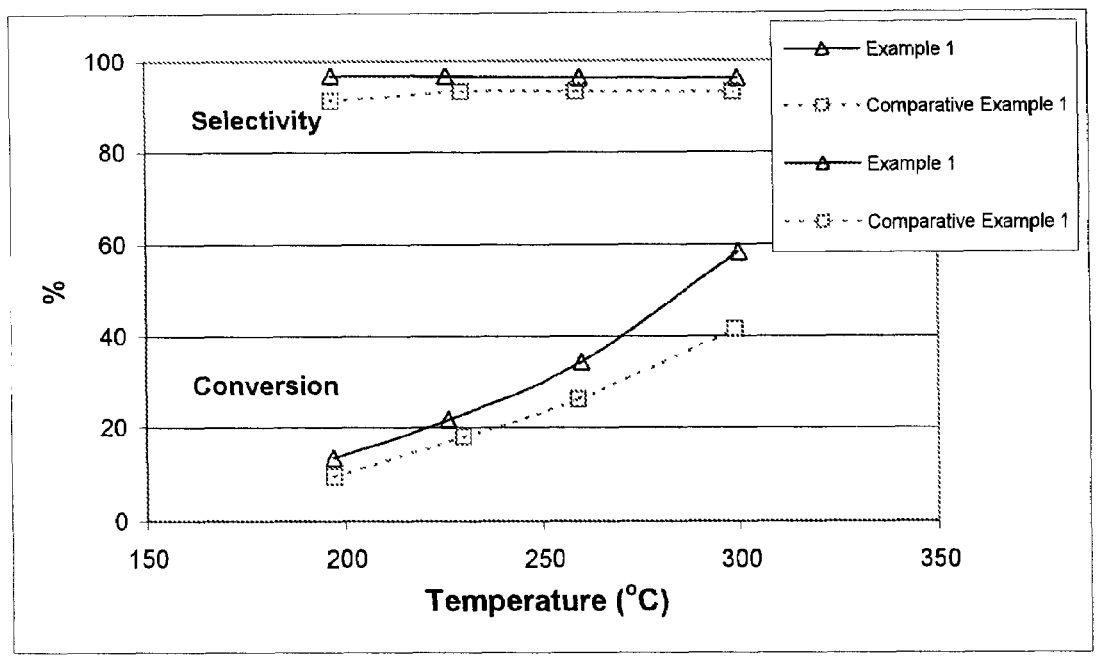
FIG. 1 is a graphical illustration comparing carbon dioxide selectivity and the methanol conversion rate at different temperatures for a steam reforming catalyst within the scope of the invention and a steam reforming catalyst outside the scope of the invention.

The alcohol steam reforming catalyst of the invention converts a lower alcohol such as methanol into hydrogen and carbon oxides (carbon monoxide, carbon dioxide). In the specific case where the lower alcohol is methanol, the alcohol steam reforming catalyst may be called a methanol steam reforming catalyst.

When a suitable amount of yttrium is included in a steam reforming catalyst based on palladium, a metal oxide and/or cerium, and optionally zinc, a steam reforming catalyst that can withstand exposure to high temperatures is provided. Consequently, in some embodiments, the steam reforming catalyst can be contacted or impregnated on an unfired ceramic structure and withstand the firing procedure required to transform the unfired ceramic into a ceramic structure. An advantage in these embodiments is that catalyst deposition can be performed more readily than attempting to apply the catalyst to a finished or fired ceramic piece. The ability to withstand high temperatures is a significant advantage over conventional Cu—Zn steam reforming catalysts that cannot tolerate such high temperatures.

In the alcohol steam reforming catalyst art field, performance advances are difficult to obtain. The generation of carbon monoxide is undesired as carbon monoxide is a poison to the fuel cell electrode. Even generating small amounts of carbon monoxide can cause significant degradation. Consequently, any decrease in generating carbon monoxide is a positive advance in the steam reforming catalyst art field. The alcohol steam reforming catalysts of the invention containing yttrium, palladium, a metal oxide and/or cerium, and optionally zinc generally display high carbon dioxide selectivity and thus have reduced or mitigated generation of carbon monoxide.

It is also difficult to improve both good methanol activity and good carbon dioxide selectivity in alcohol steam reforming catalysts. Often, improvement in one of these properties results in a decrease in the other property. Consequently, merely combining two catalyst components (one that improves methanol activity and the other that improves carbon dioxide selectivity) does not typically result in a material that has both good methanol activity and good carbon dioxide selectivity. As mentioned above, even small increases in carbon monoxide generation are disfavored because of the large resultant poisoning effect.

When a suitable amount of yttrium is included in a steam reforming catalyst based on palladium, a metal oxide and/or cerium, and optionally zinc, a steam reforming catalyst that departs from the undesired trade-off relationship results. Specifically, steam reforming catalysts containing yttrium, palladium, a metal oxide and/or cerium, and optionally zinc display both desirable properties of a high alcohol/methanol conversion rate and high carbon dioxide selectivity.

The alcohol steam reforming catalysts contain suitable amounts of a metal oxide and/or cerium, yttrium, palladium, and optionally zinc in a suitable manner and amount that facilitates both high alcohol/methanol conversion and high carbon dioxide selectivity (without sacrificing one desirable characteristic for the other). For example, the alcohol steam reforming catalysts contain suitable amounts of cerium oxide, yttrium, palladium, and zinc.

The steam reforming catalyst contains a suitable amount of at least one metal oxide and/or cerium to contribute to high methanol conversion (high methanol activity) properties. The cerium may or may not act as a support. As used herein, reference to cerium means cerium in any of its forms or any species containing cerium including metallic cerium, ionic cerium, cerium oxide, cerium in an alloy with at least one other metal (such as palladium, yttrium, and/or zinc), and combinations of two or more of these forms. In instances where the steam reforming catalyst is subjected to high temperatures, such as during firing of a green ceramic substrate coated with the steam reforming catalyst, two or more metals of the steam reforming catalyst may form an alloy.

If the steam reforming catalyst does not contain cerium, then the steam reforming catalyst contains at least one metal oxide. Examples of metal oxides include alumina, silica, alumina-silicates, titania, zirconia, stabilized ceria, magnesia, manganese oxide, lanthanum oxide, cobalt oxide, iron oxide, other transition metal oxides, ceria-zirconia, other mixed metal oxides, and the like.

In one embodiment, the steam reforming catalysts contain at least about 10% by weight of at least one metal oxide and/or cerium, and typically from about 10% to about 99% by weight of at least one metal oxide and/or cerium. In another embodiment, the steam reforming catalysts contain at least about 20% by weight of at least one metal oxide and/or cerium, and typically from about 20% to about 95% by weight of at least one metal oxide and/or cerium. In yet another embodiment, the steam reforming catalysts contain at least about 30% by weight of at least one metal oxide and/or cerium, and typically from about 30% to about 85% by weight of at least one metal oxide and/or cerium. In still yet another embodiment, the steam reforming catalysts contain from about 40% to about 80% by weight of at least one metal oxide and/or cerium.

The steam reforming catalyst may optionally contain a suitable amount of zinc to contribute to high carbon dioxide selectivity properties. As used herein, reference to zinc means zinc in any of its forms or any species containing zinc including metallic zinc, ionic zinc, zinc oxide, zinc in an alloy with at least one other metal (such as palladium, yttrium, and/or cerium), and combinations of two or more of these forms. The zinc oxide if and when present may or may not act as a support. In one embodiment, the steam reforming catalysts contain from about 0.1% to about 99% by weight of zinc. In another embodiment, the steam reforming catalysts contain from about 0.25% to about 80% by weight of zinc. In yet another embodiment, the steam reforming catalysts contain from about 1% to about 70% by weight of zinc. In still yet another embodiment, the steam reforming catalysts contain from about 5% to about 60% by weight of zinc. Since the presence of zinc is optional, the lower figure may be 0% combined with any of the numerical figures listed above.

In an embodiment where the steam reforming catalyst contains metallic zinc or zinc alloyed with one or more other metals, the steam reforming catalyst contains from about 0.1% to about 50% by weight of metallic or alloyed zinc. In another embodiment where the steam reforming catalyst contains metallic zinc or zinc alloyed with one or more other metals, the steam reforming catalyst contains from about 0.25% to about 25% by weight of metallic or alloyed zinc. In yet another embodiment where the steam reforming catalyst contains metallic zinc or zinc alloyed with one or more other metals, the steam reforming catalyst contains from about 0.5% to about 10% by weight of metallic or alloyed zinc.

When cerium and zinc, if present, act in part as support materials, typically in the form of their oxides, the steam reforming catalyst may or may not contain additional support materials, such as those commonly used as catalyst support materials. When the cerium and/or zinc, if present, are not present as support materials, the steam reforming catalyst may contain support materials. Examples of additional support materials include ceramic materials, zeolites, clays, calcined clays, and metal oxides such as alumina, silica, alumina-silicates, titania, zirconia, ceria-zirconia, stabilized ceria, and the like. In some instances, the use of ceramic materials as the support provides steam reforming catalyst that can withstand high thermal loads (such as greater than about 500° C.), both in making and using the steam reforming catalyst. In one embodiment, the steam reforming catalysts contain from about 1% to about 80% by weight of additional support materials. In another embodiment, the steam reforming catalysts contain from about 2% to about 40% by weight of additional support materials.

The steam reforming catalyst may contain suitable amounts of support and catalytically active metals to facilitate both high methanol conversion and high carbon dioxide selectivity. In one embodiment, the steam reforming catalyst contains from about 25% to about 99% by weight of support and from about 1% to about 75% by weight of catalytically active metals. In another embodiment, the steam reforming catalyst contains from about 40% to about 98% by weight of support and from about 2% to about 60% by weight of catalytically active metals. In yet another embodiment, the steam reforming catalyst contains from about 60% to about 95% by weight of support and from about 5% to about 40% by weight of catalytically active metals.

The steam reforming catalyst contains a suitable amount of palladium to contribute to high methanol activity properties and/or the high carbon dioxide selectivity properties. As used herein, reference to palladium means palladium in any of its forms or any species containing palladium including metallic palladium, ionic palladium, palladium oxide, palladium in an alloy with one or more other metals (such as zinc, yttrium, and/or cerium), and combinations of two or more of these forms. In one embodiment, the steam reforming catalyst contains from about 0.1% to about 50% by weight of palladium. In another embodiment, the steam reforming catalyst contains from about 0.5% to about 25% by weight of palladium. In yet another embodiment, the steam reforming catalyst contains from about 1% to about 15% by weight of palladium.

The steam reforming catalyst contains a suitable amount of yttrium to contribute to both high methanol activity properties and the high carbon dioxide selectivity properties. As used herein, reference to yttrium means yttrium in any of its forms or any species containing yttrium including metallic yttrium, ionic yttrium, yttrium oxide, yttrium in an alloy with at least one other metal (such as palladium, zinc, and/or cerium), and combinations of two or more of these forms. In one embodiment, the steam reforming catalyst contains from about 0.1% to about 50% by weight of a yttrium compound. In another embodiment, the steam reforming catalyst contains from about 0.25% to about 25% by weight of a yttrium compound. In yet another embodiment, the steam reforming catalyst contains from about 0.5% to about 15% by weight of a yttrium compound.

The steam reforming catalyst may optionally contain a suitable amount of another metal compound that contributes to either high methanol activity properties or the high carbon dioxide selectivity properties. Examples of such metals include copper, platinum, silver, gold, and nickel. However, in another embodiment, the steam reforming catalyst does not contain one or more of copper, platinum, silver, gold, and nickel.

The steam reforming catalyst is made by contacting and/or mixing palladium, yttrium, cerium and/or the metal oxide, zinc if present, and support if present. For example, the steam reforming catalyst may be made by contacting a metal oxide and/or cerium oxide, zinc oxide if present, with a solution containing palladium and yttrium. Alternatively, the steam reforming catalyst may be made by contacting a metal oxide and/or cerium and zinc oxide if present, with a first solution of a first catalytically active metal such as palladium, followed by or simultaneous contacting a metal oxide and/or cerium and zinc if present, with a second solution of a second catalytically active metal such as yttrium (and/or a third solution with a third catalytically active metal such as zinc). The solution of catalytically active metal may contain one or more catalytically active metals, two or more catalytically active metals, or three or more catalytically active metals.

The support when present is typically in one of granular form, powder form, or a green ceramic. In one embodiment, the support has a particle size (average particle size) of less than about 100 microns. In another embodiment, the support has a particle size of less than about 80 microns. In yet another embodiment, the support has a particle size of less than about 50 microns. Further processing may reduce particle size after catalyst formation.

Generally, the surface area of the catalyst support corresponds to a weighted average of the surface area of the metal oxides or the ceramic structure in/on which the catalyst is loaded. In one embodiment, the surface area of the catalyst support is about 1 $m^2/g$ or more and about 1,500 $m^2/g$ or less.

In another embodiment, the surface area of the catalyst support is about 25 $m^2/g$ or more and about 1,000 $m^2/g$ or less.

In some instances, prior to using the cerium oxide or at least cerium oxide and zinc oxide and optionally other materials as a support, the materials may be treated to obtain desired particle size and/or surface area. For example, the materials may be charged into a mill, a crusher, a mixer, a pulverizer, and the like to effect some physical change.

The metal solutions containing the catalyst components typically contain a liquid solvent and a suitable amount of at least one metal providing compound (palladium providing compounds, yttrium providing compounds, cerium providing compounds, and zinc providing compounds). The liquid solvent is typically water, an organic solvent such as an alcohol, ester, ketone, and any combination thereof. In one embodiment, the metal solutions contain a liquid solvent and about 0.1% by weight or more and about 90% by weight or less of at least one metal providing compound. In another embodiment, the metal solutions contain a liquid solvent and about 1% by weight or more and about 50% by weight or less of at least one metal providing compound. Metal oxides can be in solution, but are typically in powder or granular form.

Examples of palladium providing compounds include palladium acetate, palladium acetylacetonate, palladium halide, palladium hexafluoroacetylacetonate, palladium nitrate, palladium oxide, palladium proprionate, palladium sulfate, palladium sulfide, and palladium trifluoroacetate. Additionally, palladium metal may be provided in an acid solution, such as palladium in a 0.1-5% nitric acid solution or palladium in a nanosized powder that is added to a liquid.

Examples of yttrium providing compounds include yttrium acetate, yttrium acetylacetonate, yttrium halide, yttrium carbonate, yttrium ethylhexanoate, yttrium hexafluoroacetylacetonate, yttrium isopropoxide, yttrium nitrate, yttrium oxalate, yttrium oxide, yttrium perchlorate, yttrium sulfate, and yttrium trifluoroacetate. Additionally, yttrium metal may be provided in an acid solution, such as yttrium in a 0.1-5% nitric acid solution.

Examples of cerium providing compounds include cerium acetate, cerium acetylacetonate, cerium halide, cerium carbonate, cerium ethylhexanoate, cerium nitrate, cerium oxide, cerium perchlorate, and cerium sulfate. Additionally, cerium metal may be provided as a nanosized powder or in an acid solution, such as cerium in a 0.1-5% nitric acid solution.

Examples of zinc providing compounds include zinc acetate, zinc acetylacetonate, zinc acrylate, zinc halide, zinc carbonate, zinc citrate, zinc lactate, zinc nitrate, zinc hexafluoroacetylacetonate, zinc oxide, zinc perchlorate, zinc stearate, zinc sulfate, zinc sulfide, and zinc trifluoroacetate. Additionally, zinc metal may be provided in a nanosized powder that is added to a liquid.

When the cerium and/or metal oxide, palladium providing compound, yttrium providing compound, and optional zinc providing compound are contacted in solution, depending upon the amount of solution used and the wettability of the support, either a wet powder or a slurry is formed. A slurry can be optionally ball milled, then dried at a suitable temperature for a suitable period of time to yield a steam reforming catalyst in powder form. In one embodiment, drying involves exposing the slurry in a chamber such as an oven to a temperature of about 30° C. or more and about 100° C. or less for a time from about 10 minutes to about 30 hours. In another embodiment, drying involves exposing the slurry in a chamber such as an oven to a temperature of about 40° C. or more and about 90° C. or less for a time from about 30 minutes to about 20 hours.

Various additives may be charged into the slurry or wet powder to facilitate formation of the steam reforming catalyst in desired form (such as a formed shape or coating on a monolith substrate). Examples of such additives include binders, pH adjusters, drying agents, and the like.

The slurry contains a suitable amount of solids to form the steam reforming catalyst in desired form, such as either a formed shape or a coating on a monolith substrate. In one embodiment, the slurry contains about 5% or more and about 95% or less of solids. In another embodiment, the slurry contains about 10% or more and about 90% or less of solids.

The slurry may be contacted with a green ceramic substrate, then cofired with the green ceramic substrate to form a ceramic device with the steam reforming catalyst thereon/therein. The green substrate is typically made via tape casting methods, while the catalyst slurry is applied via such methods including screen printing, spray coating, and thick film deposition, among others. Alternatively, green ceramic material may constitute a portion of a wet powder, and the wet powder can be shaped and fired to provide a ceramic device with the steam reforming catalyst thereon/therein. One advantage in certain embodiments is the ability of the steam reforming catalyst forming materials can withstand high temperatures, such as those required to form a fired ceramic from a green ceramic.

Optionally, the steam reforming catalyst can be heated at elevated temperatures for a suitable period of time before or after it is formed into any desired shape or before or after it is coated onto a substrate. In one embodiment, the steam reforming catalyst is heated at a temperature of about 100° C. or more and about 850° C. or less for a time from about 10 minutes to about 50 hours. In another embodiment, the steam reforming catalyst is heated at a temperature of about 200° C. or more and about 700° C. or less for a time from about 30 minutes to about 10 hours. In one embodiment, the optional heating may involve calcining the steam reforming catalyst.

The steam reforming catalyst is then optionally formed into any desired shape. Examples of forming machines include molding machines, pressing machines, tableting machines, rolling granulators, marumarizers, and pelletors. The shape of the catalyst material includes spheres, tablets, cylinders, stars, tri-lobes, quadra-lobes, pellets, granules, honeycombs, and cubes. The shapes, generally referred to as "particulate", may have any suitable size.

As an alternative to forming the steam reforming catalyst into any desired shape, a substrate such as a monolith substrate can be coated with the steam reforming catalyst. In this instance, a monolith substrate can be contacted with the slurry of the support and catalytically active metals. A monolith substrate can have one or more monolithic bodies having a plurality of finely divided gas flow passages extending therethrough. These monolith substrates are often referred to as "honeycomb" type substrates. The substrate can be made of a refractory, substantially inert, rigid material which is capable of maintaining its shape and a sufficient degree of mechanical conditions at high temperatures, such as at least about 1,000° C. Typically, the substrate material exhibits at least one of a low thermal coefficient of expansion, good thermal shock resistance, and low thermal conductivity.

Monolith substrates generally have a cylindrical configuration (either round or oval in cross section) and have a plurality of parallel gas flow passages of polygonal cross sectionals extending therethrough. The gas flow passages are sized to provide from about 50 to about 1,200 gas flow channels per square inch of face area.

There are at least two general types of materials of construction for monolith substrates. One is a ceramic-like porous material composed of one or more metal oxides, e.g., alumina, alumina-silica, alumina-silica-titania, mullite, cordierite, zirconia, zirconia-ceria, zirconia-spinel, zirconia-mullite, silicon-carbide, and the like.

Another type of material of construction for the monolith substrate is a heat- and/or oxidation-resistant metal, such as stainless steel or an iron-chromium alloy. Monolith substrates can be fabricated from such materials by placing a flat and a corrugated metal sheet one over the other and rolling the stacked sheets into a tubular configuration about an axis parallel to the configurations, to provide a cylindrical-shaped body.

The monolith substrate may alternatively be present in the form of a ceramic or metal foam. The monolith substrate may also be present in the form of a heat exchanger, e.g., a shell-and-tube exchanger or a fin-type exchanger of the type similarly employed in automobile radiators. The substrate may be in the form of miniature channels with optional spaces positioned therebetween.

When the steam reforming catalyst is coated on a monolith substrate, a suitable amount is provided to produce hydrogen. In one embodiment, the loading of the steam reforming catalyst coated on the monolith substrate is about 0.1 $g/in^3$ or more and about 10 $g/in^3$ or less. In another embodiment, the loading of the steam reforming catalyst coated on the monolith substrate is about 0.5 $g/in^3$ or more and about 5 $g/in^3$ or less.

While the steam reforming catalyst may be in the form of a powder or pressed into pellets, in small-scale applications involving miniature devices and reactors with meso scale (meso reactors with structural features on the order of millimeters) and micro scale (micro reactors with structural features on the order of micrometers) features, including channels and other miniature device structures, pellets are not feasible due to their size. And both pellets and powders are not often mechanically stable in smaller configurations. In this connection, concerns over attrition, clogging of channels, sufficient adherence to the substrate, and stability during vibration are raised. Thus, while a steam reforming catalyst in the form of a powder or pellets is appropriate in larger devices, diminished performance may result when using the steam reforming catalyst in the form of a powder or pellets in miniature devices and reactors.

In some embodiments, the steam reforming catalyst is formed on/in a ceramic monolith substrate to provide for a miniaturized chemical reactor including a porous ceramic material having a catalyst immobilized within or upon the porous ceramic material. In miniature devices and reactors, it may be more desirable to have an immobilized support that retains the high porosity and surface area possible with bulk powders. When the steam reforming catalyst is formed on/in a ceramic monolith substrate, the immobilized catalyst is positioned in such a way as to allow reactants to intimately contact the immobilized catalyst, while not degrading the catalytic activity of the catalyst.

When fabricating a monolithic steam reforming catalyst system using multilayer ceramic structures, the reactors that constitute the system which typically include a post fire deposition of a catalyst, do not provide for selective deposition of the catalyst material post firing. This is because, in part, it is difficult to deposit catalyst into small channels (especially meso- or micro- sized channels). In many instances, since the structure is fired prior to introduction of the steam reforming catalyst, the steam reforming catalyst is not able to be positioned where it is needed so as to provide optimum temperature profiles as desired.

In order to make steam reforming catalyst system containing multilayer ceramic structures, a green multilayer ceramic structure is coated with the steam reforming catalyst described herein containing yttrium, palladium, a metal oxide and/or cerium, and optionally zinc, and then the coated green multilayer ceramic structure is fired to provide a steam reforming catalyst system. This steam reforming catalyst system may have a honeycomb structure, and may or may not contain spacers between individual reactors. The ceramic substrate may be porous ceramic substrate.

When the steam reforming catalyst is formed on/in a ceramic substrate to form a steam reforming catalyst system, a miniaturized chemical reactor is provided by cofiring the steam reforming catalyst immobilized on and/or within a ceramic substrate. Accordingly, the inventive catalyst composition is suitable for processing a chemical reactor including a cofirable steam reforming catalyst that can withstand the processing temperatures of the multilayer ceramic structures and yet maintain good catalytic activity after firing.

In one embodiment, the steam reforming catalyst is applied as a screen printable or stencil printable thickfilm paste that is cofirable with a multilayer green ceramic substrate. A thickfilm paste for cofirable steam reforming catalyst may contain an organic binder made up of, for example, a cellulose, a carrier system, and the steam reforming catalyst mixed thoroughly into a viscous paste suitable for screen printing process. During fabrication, the plurality of ceramic layers and cofirable steam reforming catalyst are sintered or fired together to form a reactor. During this sintering process, the organic components of the thickfilm cofirable steam reforming catalyst burn out, leaving a finely dispersed high surface steam reforming catalyst deposited on the support.

In a multilayer ceramic process, individual ceramic layers may contain a glass component to facilitate sintering at lower temperatures. However, in this case, during the sintering process, this glass can diffuse into the steam reforming catalyst thereby reducing its effectiveness. Consequently, the thickfilm screen print steam reforming catalyst thicknesses is from about 10 μm to about 500 μm. At high thicknesses, too much steam reforming catalyst may be used which may not be required for the device functionality but undesirably increases the cost of the device. At the low end, precautions need to be taken to prevent glass diffusion into the entire steam reforming catalyst print layer thickness. In another embodiment, a barrier layer containing porous alumina between the steam reforming catalyst print layer and the substrate prevents glass diffusion into the steam reforming catalyst print layer, thereby allowing for the printing of thinner catalyst layers, such as less than about 10 μm in thickness.

The steam reforming catalyst is involved in the production of hydrogen, typically hydrogen gas. Most often, the steam reforming catalyst is involved in the production of hydrogen from methanol and water. While not wishing to be bound by any theory, it is believed that, generally speaking, the methanol steam reforming reaction may be represented by the following unbalanced chemical equation (1):

$$CH_3OH+H_2O \leftrightharpoons H_2+CO \text{ and/or } CO_2 \quad (1)$$

In some instances, the methanol steam reforming reaction can be represented by two reactions; namely, a first cracking reaction followed by a water gas shift reaction. Both reactions can be represented by the following chemical equations (2) and (3):

$$CH_3OH+H_2O \leftrightharpoons 2H_2+CO \quad (3)$$

$$CO+H_2O \leftrightharpoons H_2+CO_2 \quad (4)$$

Although methanol is shown as the alcohol, it is noted that other lower alcohols (alcohols containing 1 to about 8 carbon atoms) can be employed. In this context, the steam reforming catalyst is involved in the production of hydrogen from a lower alcohol and water. Examples of lower alcohols include methanol, ethanol, propanol, butanol, pentanol, hexanol, heptanol, octanols, isomers thereof, and combinations thereof. The lower alcohol and water can be in the gaseous and/or liquid state.

The steam reforming catalyst can be used in any suitable system or application such as a fuel cell that generates hydrogen from at least one of methanol and water. The steam reforming catalyst can be positioned within a reaction chamber, such as a small channel, of a methanol steam reformer fuel cell.

An alcohol is reacted with water vapor in the presence of the steam reforming catalyst for a suitable time to generate hydrogen. In one embodiment, an alcohol is reacted with water vapor in the presence of the steam reforming catalyst for a time of about 10 milliseconds or more and about 10 seconds or less. In another embodiment, an alcohol is reacted with water vapor in the presence of the steam reforming catalyst for a time of about 100 milliseconds or more and about 1 second or less.

An alcohol is reacted with water vapor in the presence of the steam reforming catalyst at a suitable pressure to generate hydrogen. In one embodiment, an alcohol is reacted with water vapor in the presence of the steam reforming catalyst at a pressure of about 0.1 atmosphere or more and about 100 atmosphere or less. In another embodiment, an alcohol is reacted with water vapor in the presence of the steam reforming catalyst at a pressure of about 0.5 atmosphere or more and about 5 atmosphere or less.

The steam reforming catalyst operates at a suitable temperature to generate hydrogen. In one embodiment, the steam reforming catalyst operates at a temperature of about 150° C. or more and about 500° C. or less. In another embodiment, the steam reforming catalyst operates at a temperature of about 175° C. or more and about 400° C. or less. In yet another embodiment, the steam reforming catalyst operates at a temperature of about 190° C. or more and about 300° C. or less.

The steam reforming catalysts have both good methanol activity and good carbon dioxide selectivity. Methanol activity or methanol conversion rate refers to the percentage of methanol (or other alcohol) that is broken down and reacts with water. Methanol activity in % can be determined using the equation:

$$\% = \frac{[CO]+[CO_2]}{[CO]+[CO_2]+[CH_3OH]} \times 100$$

Carbon dioxide selectivity refers to the desirable production of carbon dioxide rather than the undesirable production of carbon monoxide. Carbon monoxide is a poison to the fuel cell electrode, and therefore the generation of carbon monoxide is desirably kept to a minimum. Carbon dioxide selectivity in % can be determined using the equation:

$$\% = \frac{[CO_2]}{[CO_2]+[CO]} \times 100$$

Carbon dioxide selectivity may include the conversion of carbon monoxide to carbon dioxide within the system.

In one embodiment, steam reforming catalysts have both a methanol activity of at least about 10% and a carbon dioxide selectivity of at least about 90% at 205° C. In another embodiment, steam reforming catalysts have both a methanol activity of at least about 15% and a carbon dioxide selectivity of at least about 90% at 215° C. In yet another embodiment, steam reforming catalysts have both a methanol activity of at least about 20% and a carbon dioxide selectivity of at least about 90% at 225° C. In still yet another embodiment, steam reforming catalysts have both a methanol activity of at least about 30% and a carbon dioxide selectivity of at least about 90% at 240° C.

A variety of reactors can employ the steam reforming catalysts described herein. Examples include fuel cell reactors, steam reformers, chemical reactors, conversion reactors, and the like. Instead of the fuel cell, the hydrogen may be transported to one of a storage tank, a refueling station, a hydrocracker, hydrotreater, or to additional hydrogen purifiers. The hydrogen may be employed as a synthesis gas, as a component in hydrogenation reactions, and the like.

The alcohol reforming reactor may also be configured by placing the reaction chamber adjacent to a heat exchanger chamber that is comprised of an array of microchannels or a single microchannel. The width of the reaction chamber is dependent on the effective thermal conductivity of the catalyst insert. The higher the effective thermal conductivity of the catalyst insert, the wider the insert to enable rapid heat removal.

In another configuration, the reaction chamber may be connected to a fuel tank such that alcohol from the tank can flow directly into the reaction chamber. Although a fuel tank is commonly used, it is to be recognized that any alcohol fuel source, such as a pipeline could be used. The liquid fuel stream may flow through a separate vaporizer or be vaporized within a section of the steam-reforming reactor. In some embodiments, the alcohol is vaporized in a microchannel vaporizer and/or preheated in a microchannel preheater.

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

EXAMPLE 1

A yttrium-containing solution was prepared by adding 76.6 g $Y(NO_3)3.6H_2O$ to 50 g of distilled $H_2O$, diluting with distilled $H_2O$ to 100 mL, then stirring to generate a clear solution. A separate zinc-containing solution was prepared by adding 118.98 g $Zn(NO_3)2.6H_2O$ to 100 g of distilled $H_2O$, diluting with distilled $H_2O$ to 200 mL, then stirring to generate a clear solution. A separate palladium nitrate solution containing 20.74 wt % palladium was used.

100.0 g of a zirconia-stabilized ceria was placed into a plastic beaker. Then, a solution was prepared by mixing 22.1 mL of the yttrium-containing solution, 122.8 mL of the zinc-containing solution, and 40.7 mL of the palladium-containing solution. After thoroughly mixing, the resulting solution was then added directly to the zirconia-stabilized ceria powder with stirring.

The resulting mixture was then dried in an oven at 75 degrees centigrade for 16 hours. After drying, the mixture was then heated in a furnace at 540 degrees centigrade for 3 hours. The rest of the powder was placed into a ball mill with 4% binder added and diluted to 45% solids. The mixture was then milled until 90% of the particles were under 10 μm in diameter. A 400 cpsi monolith was then coated with the resulting slurry until a loading of 2.0 g/in$^3$ was achieved. Afterwards, the monolith was dried at 115 degrees centigrade for 2 hours, then calcined at 550 degrees centigrade for 2 hours. A 0.5" diameter and 1" long monolith sample was reduced in 7% $H_2$ balanced with $N_2$ at 500 degrees centigrade for 1 hour before the activity test.

EXAMPLE 2

A yttrium-containing solution was prepared by adding 76.6 g $Y(NO_3)3.6H_2O$ to 50 g of distilled $H_2O$, diluting with distilled $H_2O$ to 100 mL, then stirring to generate a clear solution. A separate zinc-containing solution was prepared by adding 118.98 g $Zn(NO_3)2.6H_2O$ to 100 g of distilled $H_2O$, diluting with distilled $H_2O$ to 200 mL, then stirring to generate a clear solution. A separate palladium nitrate solution containing 20.74 wt % palladium was used.

100.0 g of cerium oxide powder was placed into a plastic beaker. Then, a solution was prepared by mixing 22.1 mL of the yttrium-containing solution, 122.8 mL of the zinc-containing solution, and 40.7 mL of the palladium-containing solution. After thoroughly mixing, the resulting solution was then added directly to the cerium oxide powder with stirring.

The resulting mixture was then dried in an oven at 75 degrees centigrade for 16 hours. After drying, the mixture was then heated in a furnace at 540 degrees centigrade for 3 hours. The rest of the powder was placed into a ball mill with 4% binder added and diluted to 45% solids. The mixture was then milled until 90% of the particles were under 10 μm in diameter. A 400 cpsi monolith was then coated with the resulting slurry until a loading of 2.0 g/in$^3$ was achieved. Afterwards, the monolith was dried at 115 degrees centigrade for 2 hours, then calcined at 550 degrees centigrade for 2 hours. A 0.5" diameter and 1" long monolith sample was reduced in 7% $H_2$ balanced with $N_2$ at 500 degrees centigrade for 1 hour before the activity test.

EXAMPLE 3

A yttrium-containing solution was prepared by adding 76.6 g $Y(NO_3)3.6H_2O$ to 50 g of distilled $H_2O$, diluting with distilled $H_2O$ to 100 mL, then stirring to generate a clear solution. A separate zinc-containing solution was prepared by adding 59.49 g $Zn(NO_3)2.6H_2O$ to 50 g of distilled $H_2O$, diluting with distilled $H_2O$ to 100 mL, then stirring to generate a clear solution. A separate palladium nitrate solution containing 20.74 wt % palladium was used.

1.0 g of cerium oxide was placed into a small vial. Then, a solution was prepared by mixing 221 μL of the yttrium-containing solution, 1228 μL of the zinc-containing solution, and 407 μL of the palladium-containing solution. After thoroughly mixing, the resulting solution was then added directly to the cerium oxide powder with stirring.

The resulting mixture was then dried in an oven at 75 degrees centigrade for 16 hours. After drying, the mixture was then heated in a furnace at 540 degrees centigrade for 3 hours.

EXAMPLE 4

A yttrium-containing solution was prepared by adding 76.6 g $Y(NO_3)3.6H_2O$ to 50 g of distilled $H_2O$, diluting with distilled $H_2O$ to 100 mL, then stirring to generate a clear solution. A separate palladium nitrate solution containing 20.74 wt % palladium was used.

0.9 g of cerium oxide and 0.1 g of zinc oxide were placed into a small vial. Then, a solution was prepared by mixing 442 μL of the yttrium-containing solution and 407 μL of the palladium-containing solution. After thoroughly mixing, the resulting solution was then added directly to the cerium and zinc oxide powder with stirring.

The resulting mixture was then dried in an oven at 75 degrees centigrade for 16 hours. After drying, the mixture was then heated in a furnace at 540 degrees centigrade for 3 hours.

EXAMPLE 5

A yttrium-containing solution was prepared by adding 76.6 g $Y(NO_3)3.6H_2O$ to 50 g of distilled $H_2O$, diluting with distilled $H_2O$ to 100 mL, then stirring to generate a clear solution. A separate palladium nitrate solution containing 20.74 wt % palladium was used.

0.8 g of cerium oxide and 0.2 g of zinc oxide were placed into a small vial. Then, a solution was prepared by mixing 442 μL of the yttrium-containing solution and 407 μL of the palladium-containing solution. After thoroughly mixing, the resulting solution was then added directly to the cerium and zinc oxide powder with stirring.

The resulting mixture was then dried in an oven at 75 degrees centigrade for 16 hours. After drying, the mixture was then heated in a furnace at 540 degrees centigrade for 3 hours.

EXAMPLE 6

A yttrium-containing solution was prepared by adding 76.6 g $Y(NO_3)3.6H_2O$ to 50 g of distilled $H_2O$, diluting with distilled $H_2O$ to 100 mL, then stirring to generate a clear solution. A separate palladium nitrate solution containing 20.74 wt % palladium was used.

100.0 g of a support consisting of 80 wt % cerium oxide and 20 wt % zinc oxide, Aldrich product # 25, 160-7, was prepared by mixing 80.0 g of cerium oxide and 20.0 g of zinc oxide into a sealed jar and blending the mixture for 10 minutes. The resulting powder was placed into a plastic beaker. Then, a solution was prepared by mixing 22.1 mL of the yttrium-containing solution and 40.7 mL of the palladium-containing solution. After thoroughly mixing, the resulting solution was then added directly to the cerium oxide/zinc oxide blended powder with stirring.

The resulting mixture was then dried in an oven at 75 degrees centigrade for 16 hours. After drying, the mixture was then heated in a furnace at 540 degrees centigrade for 3 hours. The rest of the powder was placed into a ball mill with 4% binder added and diluted to 45% solids. The mixture was then milled until 90% of the particles were under 10 μm in diameter. A 400 cpsi monolith was then coated with the resulting slurry until a loading of 2.0 $g/in^3$ was achieved. Afterwards, the monolith was dried at 115 degrees centigrade for 2 hours, then calcined at 550 degrees centigrade for 2 hours. A 0.5" diameter and 1" long monolith sample was reduced in 7% $H_2$ balanced with $N_2$ at 500 degrees centigrade for 1 hour before the activity test.

EXAMPLE 7

A yttrium-containing solution was prepared by adding 76.6 g $Y(NO_3)3.6H_2O$ to 50 g of distilled $H_2O$, diluting with distilled $H_2O$ to 100 mL, then stirring to generate a clear solution. A separate palladium nitrate solution containing 20.74 wt % palladium was used.

100.0 g of cerium oxide powder was placed into a plastic beaker. Then, a solution was prepared by mixing 22.1 mL of the yttrium-containing solution and 40.7 mL of the palladium-containing solution. After thoroughly mixing, the resulting solution was then added directly to the cerium oxide with stirring.

The resulting mixture was then dried in an oven at 75 degrees centigrade for 16 hours. After drying, the mixture was then heated in a furnace at 540 degrees centigrade for 3 hours. The rest of the powder was placed into a ball mill with 4% binder added and diluted to 45% solids. The mixture was then milled until 90% of the particles were under 10 μm in diameter. A 400 cpsi monolith was then coated with the resulting slurry until a loading of 2.0 $g/in^3$ was achieved. Afterwards, the monolith was dried at 115 degrees centigrade for 2 hours, then calcined at 550 degrees centigrade for 2 hours. A 0.5" diameter and 1" long monolith sample was reduced in 7% $H_2$ balanced with $N_2$ at 500 degrees centigrade for 1 hour before the activity test.

EXAMPLE 8

A yttrium-containing solution was prepared by adding 76.6 g $Y(NO_3)3.6H_2O$ to 50 g of distilled $H_2O$, diluting with distilled $H_2O$ to 100 mL, then stirring to generate a clear solution. A separate palladium nitrate solution containing 20.74 wt % palladium was used.

100.0 g of a zirconia-stabilized ceria was placed into a plastic beaker. Then, a solution was prepared by mixing 22.1 mL of the yttrium-containing solution and 40.7 mL of the palladium-containing solution. After thoroughly mixing, the resulting solution was then added directly to the zirconia-stabilized ceria powder with stirring.

The resulting mixture was then dried in an oven at 75 degrees centigrade for 16 hours. After drying, the mixture was then heated in a furnace at 540 degrees centigrade for 3 hours. The rest of the powder was placed into a ball mill with 4% binder added and diluted to 45% solids. The mixture was then milled until 90% of the particles were under 10 μm in diameter. A 400 cpsi monolith was then coated with the resulting slurry until a loading of 2.0 $g/in^3$ was achieved. Afterwards, the monolith was dried, then calcined at 500 degrees centigrade for 2 hours.

COMPARATIVE EXAMPLE 1

The procedure of Example 1 was repeated, with the exception that the yttrium was not included.

COMPARATIVE EXAMPLE 2

The procedure of Example 2 was repeated, with the exception that the yttrium was not included.

Referring to FIG. 1, a graphical illustration comparing the percentage of methanol conversion rate (y axis) at different temperatures (x axis) and the percentage of carbon dioxide selectivity (y axis) at different temperatures (x axis) for Example 1, a steam reforming catalyst within the scope of the invention (triangles), and Comparative Example 1, a steam reforming catalyst outside the scope of the invention (squares). The percentages were determined at a water to methanol ratio of 1.1, 20,000 GHSV, and 100 micron mol/g/s. It is noted that Example 1, the steam reforming catalyst within the scope invention, has both a higher percentage of carbon dioxide selectivity and a higher percentage of methanol conversion rate compared to Comparative Example 1, the steam reforming catalyst outside the scope of the invention.

Figure 2:
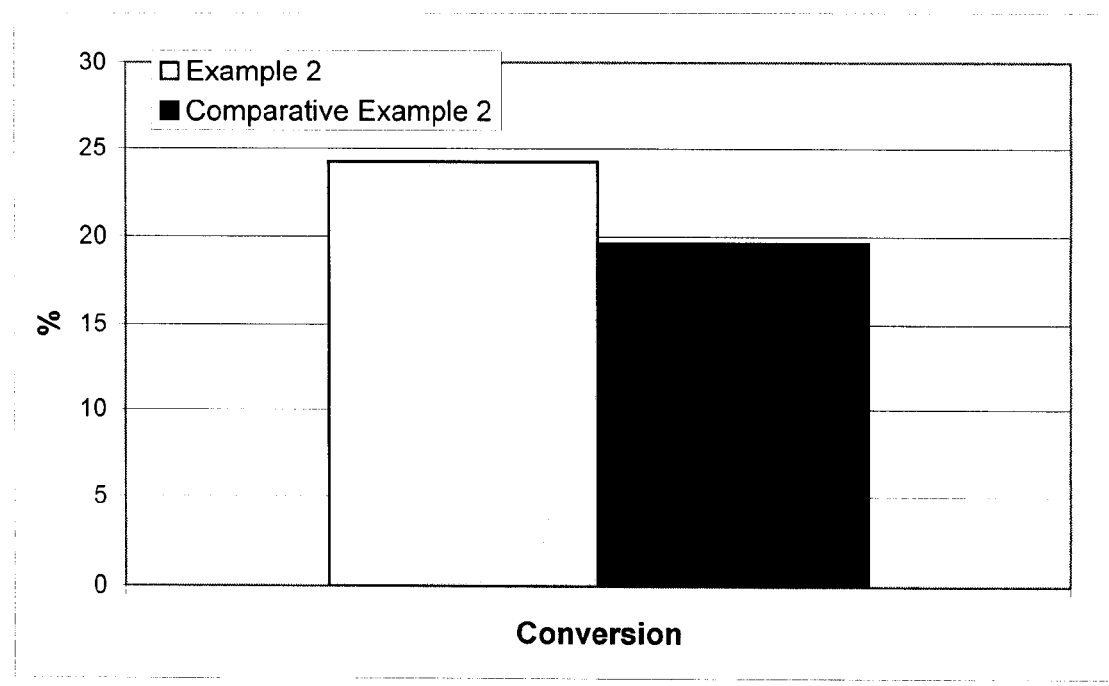
FIG. 2 is a graphical illustration comparing the methanol conversion rate at 230° C. for a steam reforming catalyst within the scope of the invention and a steam reforming catalyst outside the scope of the invention.
Figure 3:
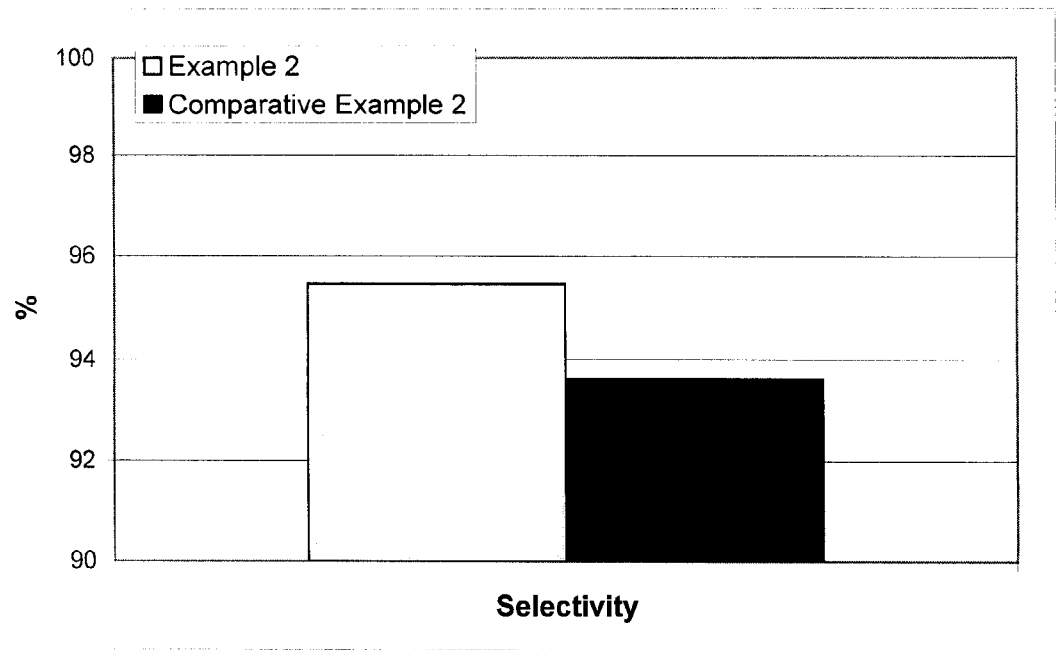
FIG. 3 is a graphical illustration comparing the carbon dioxide selectivity at 230° C. for a steam reforming catalyst within the scope of the invention and a steam reforming catalyst outside the scope of the invention.

Referring to FIGS. 2 and 3, graphical illustrations comparing the percentage of carbon dioxide selectivity (y axis) and the percentage of methanol conversion rate (y axis) for Example 2, a steam reforming catalyst within the scope of the invention (light), and Comparative Example 2, a steam reforming catalyst outside the scope of the invention (dark). The percentages were determined at 230° C., a water to methanol ratio of 1.1, 4,400 GHSV, and 200 micron mol/g/s. It is noted that Example 2, the steam reforming catalyst within the scope invention, has both a higher percentage of carbon dioxide selectivity and a higher percentage of methanol conversion rate compared to Comparative Example 2, the steam reforming catalyst outside the scope of the invention.

The power sources containing the steam reforming catalysts are characterized by at least one of long life compared to lithium ion batteries, smaller size compared to lithium ion batteries, lighter weight compared to lithium ion batteries, high energy density compared to lithium ion batteries, and high power compared to lithium ion batteries.

The steam reforming catalyst may be used in power sources, such as fuel cells, for portable (e.g., laptop and notebook) computers, cellular telephones, radios, music players, cameras, image and/or sound capture devices, and a myriad of other portable electronic devices and/or portable communications devices. Power sources including fuel cell power sources can be made for larger equipment such as household appliances, lawnmowers, snow blowers, edge trimmers, portable generators, golf carts, motorcycles, and even automobiles.

With respect to any figure or numerical range for a given characteristic, a figure or a parameter from one range may be combined with another figure or a parameter from a different range for the same characteristic to generate a numerical range.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An alcohol steam reforming catalyst for generating hydrogen consisting essentially of:
   from about 10% to about 99% by weight of cerium oxide,
   from about 0.1% to about 50% by weight of a palladium containing compound,
   from about 0.1% to about 50% by weight of an yttrium containing compound,
   from about 0.1% to about 99% by weight of a zinc containing compound, and
   optionally at least one selected from the group consisting of ceramic materials, zeolites, clays, calcined clays, and alumina-silicates.

2. A monolith substrate coated with the alcohol steam reforming catalyst of claim 1.

3. The monolith substrate of claim 2, wherein the monolith substrate comprises a fired ceramic.

4. The alcohol steam reforming catalyst of claim 1, the catalyst consisting of:
   from about 10% to about 99% by weight of cerium oxide,
   from about 0.1% to about 50% by weight of a palladium containing compound,
   from about 0.1% to about 50% by weight of a yttrium containing compound,
   from about 0.1% to about 99% by weight of a zinc containing compound, and
   optionally at least one selected from the group consisting of ceramic materials, zeolites, clays, calcined clays, and alumina-silicates.

5. The alcohol steam reforming catalyst of claim 1, the catalyst consisting of:
   from about 10% to about 99% by weight of cerium oxide,
   from about 0.1% to about 50% by weight of a palladium containing compound,
   from about 0.1% to about 50% by weight of a yttrium containing compound, and
   from about 0.1% to about 99% by weight of a zinc containing compound.

6. The alcohol steam reforming catalyst of claim 1, wherein at least a portion of the palladium containing compound and the zinc containing compound form an alloy of palladium and zinc.

7. The alcohol steam reforming catalyst of claim 1, wherein at least a portion of the palladium containing compound and the yttrium containing compound form an alloy of palladium and yttrium.

8. The alcohol steam reforming catalyst of claim 1, wherein at least a portion of the palladium containing compound and the cerium oxide form an alloy of palladium and cerium.

9. The alcohol steam reforming catalyst of claim 1, wherein at least a portion of the yttrium containing compound and the zinc containing compound form an alloy of yttrium and zinc.

10. The alcohol steam reforming catalyst of claim 1, wherein at least a portion of the yttrium containing compound and the cerium oxide form an alloy of yttrium and cerium.

11. The alcohol steam reforming catalyst of claim 1, wherein at least a portion of the zinc containing compound and the cerium oxide form an alloy of zinc and cerium.

12. The alcohol steam reforming catalyst of claim 1, wherein the palladium containing compound is at least one selected from the group consisting of metallic palladium, ionic palladium, and palladium oxide.

13. The alcohol steam reforming catalyst of claim 1, wherein the yttrium containing compound is at least one selected from the group consisting of metallic yttrium, ionic yttrium, and yttrium oxide.

14. The alcohol steam reforming catalyst of claim 1, wherein the zinc containing compound is at least one selected from the group consisting of metallic zinc, ionic zinc, and zinc oxide.

15. An alcohol steam reforming catalyst for generating hydrogen consisting essentially of:
   from about 10% by to about 99% by weight of cerium oxide,
   from about 0.1% to about 50% by weight of palladium oxide,
   from about 0.1% to about 50% by weight of yttrium oxide,
   from about 0.1% to about 99% by weight of zinc oxide, and
   optionally at least one selected from the group consisting of ceramic materials, zeolites, clays, calcined clays, and alumina-silicates.

16. The alcohol steam reforming catalyst of claim 15, wherein at least a portion of the palladium oxide and zinc oxide form an alloy of palladium and zinc.

17. A monolith substrate coated with the alcohol steam reforming catalyst of claim 15.

18. The monolith substrate of claim 17, wherein the monolith substrate comprises a fired ceramic.

19. The alcohol steam reforming catalyst of claim 15, the catalyst consisting of:
   from about 10% by to about 99% by weight of cerium oxide,
   from about 0.1% to about 50% by weight of palladium oxide, from about 0.1% to about 50% by weight of yttrium oxide, from about 0.1% to about 99% by weight of zinc oxide, and optionally at least one selected from the group consisting of ceramic materials, zeolites, clays, calcined clays, and alumina-silicates.

20. The alcohol steam reforming catalyst of claim 15, wherein at least a portion of the palladium oxide and the yttrium oxide form an alloy of palladium and yttrium.

21. The alcohol steam reforming catalyst of claim 15, wherein at least a portion of the palladium oxide and the cerium oxide form an alloy of palladium and cerium.

22. The alcohol steam reforming catalyst of claim 15, wherein at least a portion of the yttrium oxide and the zinc oxide form an alloy of yttrium and zinc.

23. The alcohol steam reforming catalyst of claim 15, wherein at least a portion of the yttrium oxide and the cerium oxide form an alloy of yttrium and cerium.

24. The alcohol steam reforming catalyst of claim 15, wherein at least a portion of the zinc oxide and the cerium oxide form an alloy of zinc and cerium.

* * * * *